United States Patent
Hesse et al.

(10) Patent No.: US 9,669,502 B2
(45) Date of Patent: Jun. 6, 2017

(54) MANUFACTURING METHOD AND MANUFACTURING APPARATUS FOR COMPONENTS

(75) Inventors: Johann Hesse, Augsburg (DE); Thomas Kollmar, Flein (DE); Bruno Emerich, Augsburg (DE); Roland Heck, Augsburg (DE); Paul Geistdörfer, Augsburg (DE); Ella Geistdörfer, legal representative, Augsburg (DE); Thomas Ziegler, Langweid am Lech (DE)

(73) Assignee: KUKA Systems GmbH, Augsburg (DE)

( * ) Notice: Subject to any disclaimer, the term of this patent is extended or adjusted under 35 U.S.C. 154(b) by 0 days.

(21) Appl. No.: 13/242,152

(22) Filed: Sep. 23, 2011

(65) Prior Publication Data

US 2012/0011696 A1  Jan. 19, 2012

Related U.S. Application Data

(62) Division of application No. 11/814,741, filed as application No. PCT/EP2006/000937 on Feb. 3, 2006, now Pat. No. 8,056,200.

(30) Foreign Application Priority Data

Feb. 3, 2005  (DE) .................... 20 2005 001 780 U

(51) Int. Cl.
*B23P 21/00* (2006.01)
*B23Q 39/04* (2006.01)
(Continued)

(52) U.S. Cl.
CPC ............ *B23P 21/006* (2013.01); *B23K 37/02* (2013.01); *B23K 37/04* (2013.01); *B23K 37/047* (2013.01);
(Continued)

(58) Field of Classification Search
CPC .............. Y10T 29/513; Y10T 29/5127; Y10T 29/5128; Y10T 29/5129; Y10T 29/5196;
(Continued)

(56) References Cited

U.S. PATENT DOCUMENTS 3,798,736 A * 3/1974 Gibbons ............... B23P 21/006
29/26 A
3,938,748 A * 2/1976 Camardella .......... B23Q 39/046
140/92.1
(Continued)

FOREIGN PATENT DOCUMENTS

FR  2773092 A1 * 7/1999 ............ B23P 21/006
GB  2364661 A * 2/2002 ........... B23Q 39/046

OTHER PUBLICATIONS

Merriam-Webster's Collegiate Dictionary, 10$^{th}$ ed. p. 1013, definition of "robot", copyright 1998.*
(Continued)

*Primary Examiner* — Erica E Cadugan
(74) *Attorney, Agent, or Firm* — McGlew and Tuttle, P.C.

(57) ABSTRACT

A manufacturing apparatus (2) for components (3), which has at least one movable loading station (20) designed as a tool magazine (13) and having reception points (39) with different tools (4, 5, 6, 7) for different component types A-I. The loading station (20) is connected to one or more machining stations (20, 22') at which at least one machining device (23) and at least one handling device (24) for handling and releasing the components (3) from the tool (4, 5, 6, 7, 8) are arranged. The selected Figure is FIG. 5.

33 Claims, 8 Drawing Sheets

(51) Int. Cl.
  *B23Q 7/02* (2006.01)
  *B23Q 7/14* (2006.01)
  *B23Q 7/16* (2006.01)
  *B23K 37/04* (2006.01)
  *B62D 65/18* (2006.01)
  *B62D 65/02* (2006.01)
  *B23Q 7/04* (2006.01)
  *B23K 37/047* (2006.01)
  *B23K 37/02* (2006.01)
  *B23K 101/00* (2006.01)

(52) U.S. Cl.
  CPC .......... *B23P 21/004* (2013.01); *B23P 21/008* (2013.01); *B23Q 7/02* (2013.01); *B23Q 7/048* (2013.01); *B23Q 7/1494* (2013.01); *B23Q 39/046* (2013.01); *B62D 65/02* (2013.01); *B62D 65/18* (2013.01); *B23K 2201/006* (2013.01); *B23P 2700/50* (2013.01); *Y10S 483/901* (2013.01); *Y10T 29/49622* (2015.01); *Y10T 29/49826* (2015.01); *Y10T 29/513* (2015.01); *Y10T 29/5137* (2015.01); *Y10T 29/5196* (2015.01); *Y10T 29/53* (2015.01); *Y10T 29/53365* (2015.01); *Y10T 29/53374* (2015.01); *Y10T 29/53404* (2015.01); *Y10T 29/53417* (2015.01); *Y10T 483/16* (2015.01); *Y10T 483/17* (2015.01)

(58) Field of Classification Search
  CPC ............... Y10T 29/5137; Y10T 483/16; Y10T 483/165; Y10T 483/17; Y10S 483/901; B23P 21/006; B23P 21/00; B23P 21/004; B23P 21/008; B23Q 39/04–39/048; B23Q 7/16; B23Q 7/02; B62D 65/18; B62D 65/02; B62D 65/00; B23K 37/04–37/047; B23K 2201/006
  USPC ........ 29/38 R, 38 C, 37 R, 564, 564.1, 33 P; 483/14–15, 16, 901; 228/4.1, 5.1, 6.1, 228/49.1, 212, 44.3
  See application file for complete search history.

(56) References Cited

U.S. PATENT DOCUMENTS

| | | | | |
|---|---|---|---|---|
| 4,152,566 A | * | 5/1979 | Magerle | 228/49.1 |
| 4,829,716 A | * | 5/1989 | Ueda et al. | 451/292 |
| 5,186,304 A | * | 2/1993 | Kaczmarek et al. | 198/346.1 |
| 5,376,061 A | * | 12/1994 | Suzuki | 483/13 |
| 5,815,902 A | * | 10/1998 | Osterried et al. | 29/38 A |
| 6,651,867 B2 | * | 11/2003 | Angel | 228/49.1 |
| 2003/0053875 A1 | * | 3/2003 | Pasquetto | 409/192 |

OTHER PUBLICATIONS

Machine Translation FR 2773092 A1, which FR '092 was published Jul. 1999.*

* cited by examiner

MANUFACTURING METHOD AND MANUFACTURING APPARATUS FOR COMPONENTS

CROSS REFERENCE TO RELATED APPLICATIONS

This application is a divisional application under 37 CFR 1.53(b) of pending prior application Ser. No. 11/814,741 filed Jul. 25, 2007, now U.S. Pat. No. 8,056,200, which is the national stage of International Application PCT/EP2006/000937 filed Feb. 3, 2006, which designated inter alia the U.S. and which claims the priority of German Patent Application DE 20 2005 001 780.9 filed Feb. 3, 2005. The entire contents of each application is hereby incorporated by reference in its entirety.

FIELD OF THE INVENTION

The invention relates to a manufacturing method and a manufacturing apparatus for components, in particular body components.

BACKGROUND OF THE INVENTION

Such a manufacturing apparatus is known from DE 203 04 022 U1. It consists of a plurality of loading stations which are each equipped with a tool for receiving the components. Arranged adjacently to the loading station are a plurality of machining stations, in particular welding stations, with a plurality of machining devices for the machining, in particular welding, of the components. In this manufacturing apparatus, the components are already partially machined and welded in the loading station. Furthermore, the components are transported between the stations by means of traveling robots.

SUMMARY OF THE INVENTION

The object of the present invention is to provide a further-developed and improved manufacturing technique.

The manufacturing technique according to the invention has the advantage that it affords maximum flexibility at a minimal outlay in terms of construction and space requirements. It gives the operator the possibility of running basically as large a number as desired of different component sorts or component types in a free mix. This also results in process-related advantages. Furthermore, the short cycle time which can be achieved by means of the manufacturing apparatus is beneficial.

In particular, a tool change or component change can take place even during the machining process in the machining station. During the remaining duration of the machining process, the returned tool can be loaded anew with a component and be provided for the next machining process. This overlap of machining and set-up times, including transport times for the delivery of the machined workpieces or components, affords an optimal time utilization and allows particularly short cycle times.

The use of a turntable as a loading station for a plurality of tools has a beneficial effect in technical and kinematic terms. This turntable may be equipped with at least one rotating carrying surface. Alternatively, the loading station may be designed as a revolving conveyor. The tools and their guides are arranged, preferably in the same plane, on the loading station, in particular the turntable. The tool change can be executed quickly, simply and exactly in position by means of a simple and easily controllable table rotation. The tool magazine on the turntable can be extended in capacity, as desired, by means of one or more connected additional tool magazines. The additional magazines may be arranged in any desired way, in adaption to the local space situation, by virtue of different exit possibilities.

The claimed manufacturing apparatus is suitable for any workpieces or components and any machining processes. Particular advantages arise in joining processes, in particular welding processes, and especially in the geometric welding of initially loose parts of the components, for example body components. The claimed manufacturing apparatus can be incorporated into larger manufacturing plants, in which case it can be linked to other plant parts or, if appropriate, also further manufacturing apparatuses.

The machining station for machining the workpieces is connected to the turntable. There are various design possibilities for this purpose. In one variant, the machining station is formed on the turntable. This entails a very low outlay in terms of construction and a corresponding cost saving. In the other variant, the machining station is arranged separately from the turntable and is connected to the latter via a tool conveyor. In this variant, more space is available for machining devices, in particular robots or the like.

The outlay in terms of construction required for magazining and transporting the tools can be kept minimal. The turntable and, if appropriate, the tool conveyor are technically simple and cost-effective structural units which, moreover, can be controlled simply and accurately. A floor-bound tool conveyor has the advantage that the space above the tools remains free and is freely accessible for loading and machining operations.

Tool occupancy on the turntable may be variable. The tool magazine can thereby be adapted in capacity and, if required, converted without high additional outlay. If the type diversity rises, the manufacturing apparatus can be adapted cost-effectively and at little outlay.

It is particularly advantageous that the reception points of the loading station can be equipped with a maximum tool and type diversity and be utilized optimally for flexibility. In particular, all the reception points can carry different tools, so that each tool type needs to be present only once. When the manufacturing capacity is to be increased and a plurality of machining stations are connected to one loading station, all the tool types can nevertheless be present only once. Multiple arrangements of tool types may be dispensed with owing to the overlap of machining and set-up times. If required, such multiple arrangements may be provided, particularly when a plurality of machining stations on one loading station machine identical workpieces or component types and the abovementioned overlap of machining and set-up times is not sufficient or the mutual coordination of these times from station to station is difficult.

The combination of a loading station and tool magazine in one common apparatus having a turntable saves considerable space, simplifies the changing operations and reduces the outlay in terms of construction. In particular, the claimed manufacturing apparatus manages with comparatively few high-quality robots and, moreover, can utilize these to a high extent.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 2:
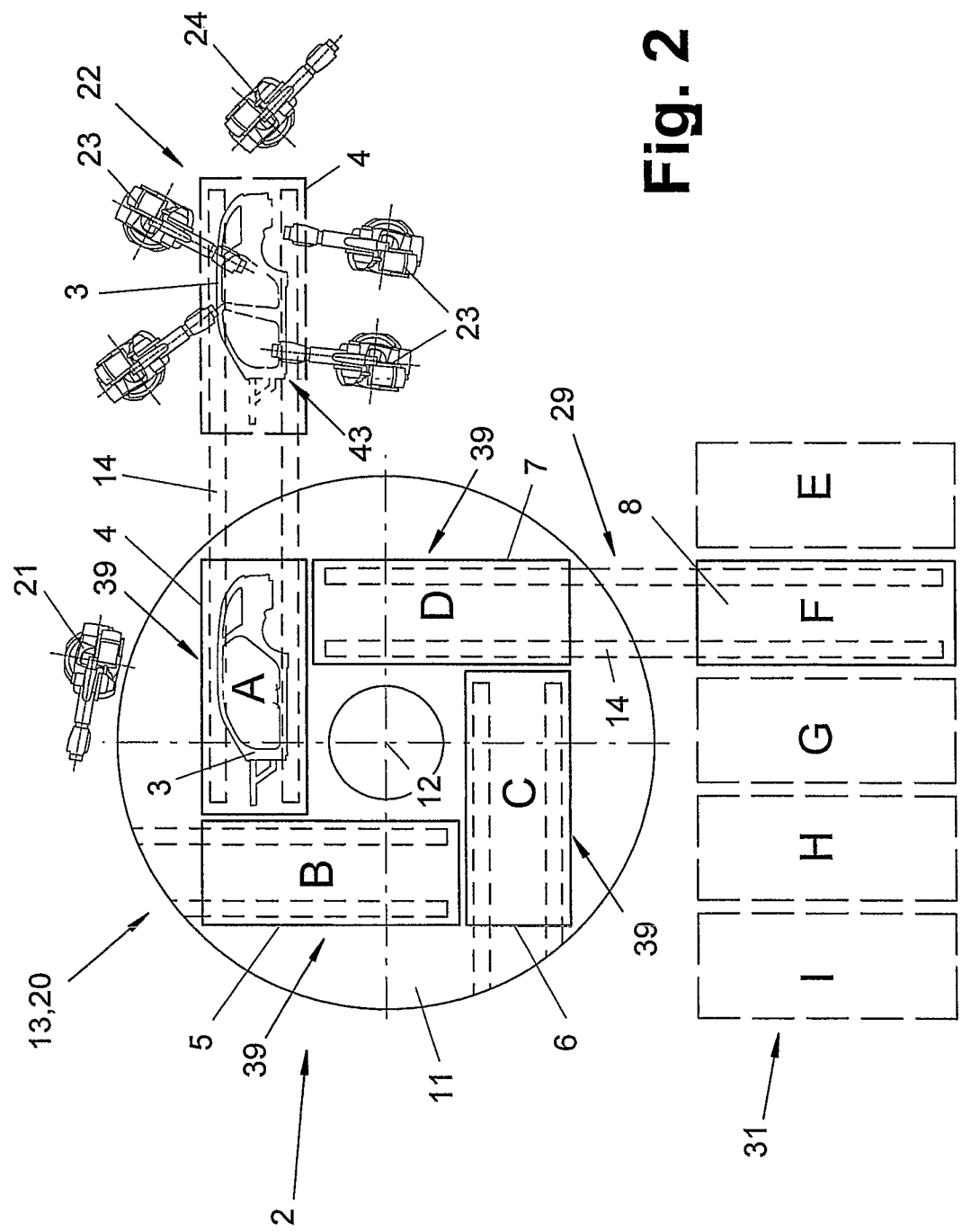
FIG. 2 is a schematic view showing a variant of the manufacturing apparatus with an additional tool magazine.
Figure 3:
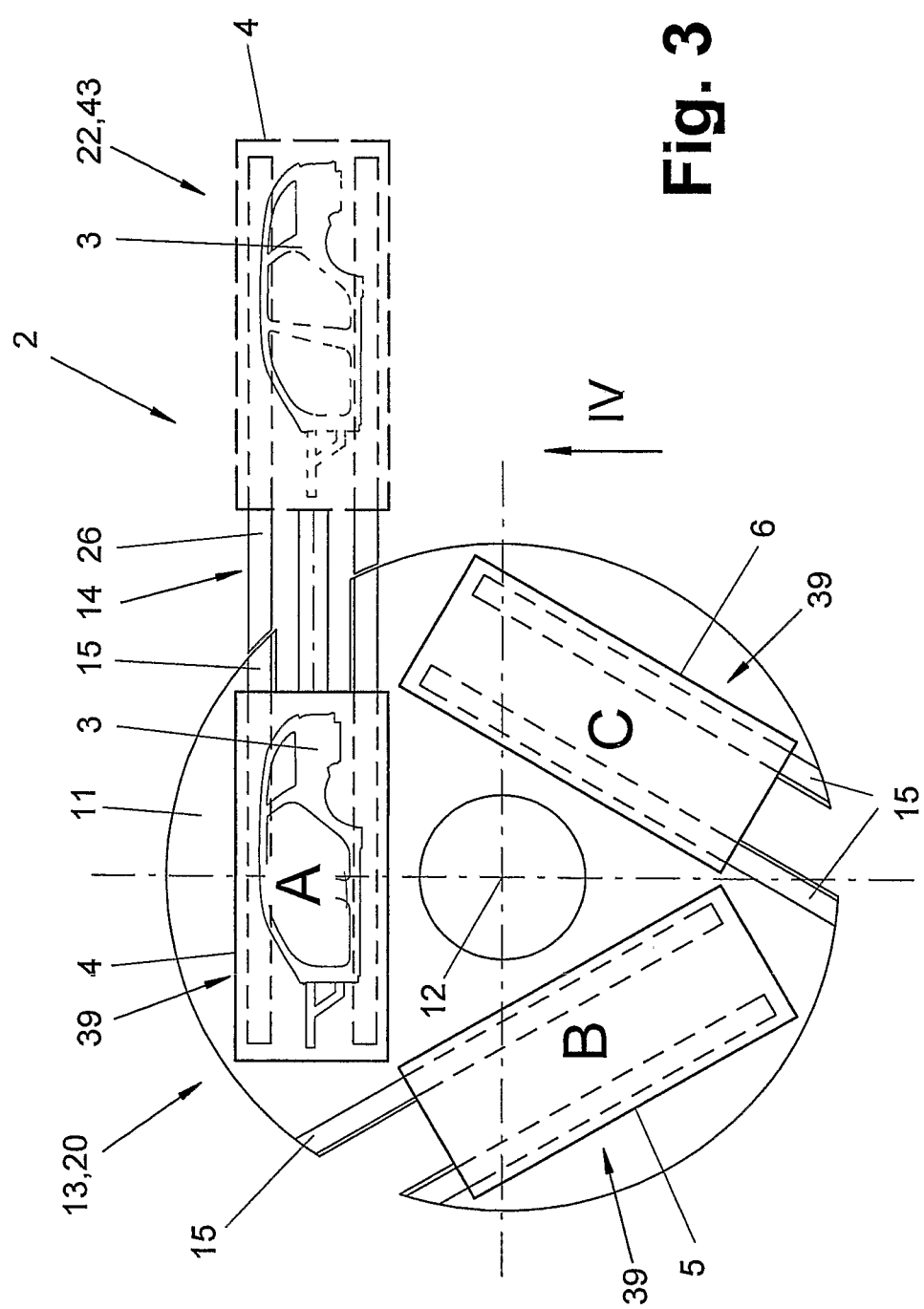
FIG. 3 is a schematic view showing a further variant of the manufacturing apparatus with another occupancy of the tool magazine.
Figure 4:
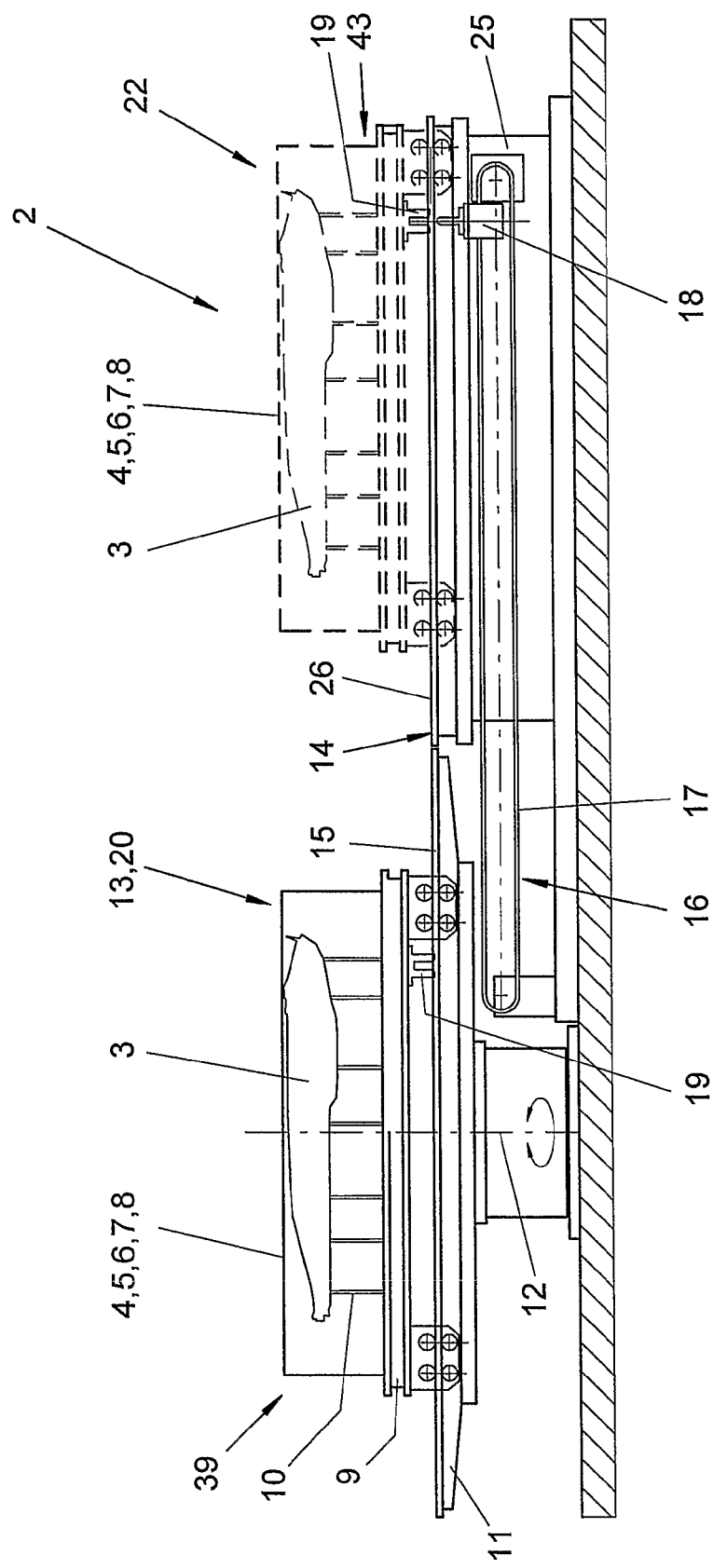
FIG. 4 is a schematic side sectional view of a manufacturing apparatus.

Referring to the drawings in particular, FIGS. 1 to 3 and 5 to 7 show diagrammatic top views of a manufacturing apparatus (2) for components (3) in several variants. FIG. 4 shows, in this respect, a diagrammatic side view according to the arrow IV of FIG. 3.

Figure 8:
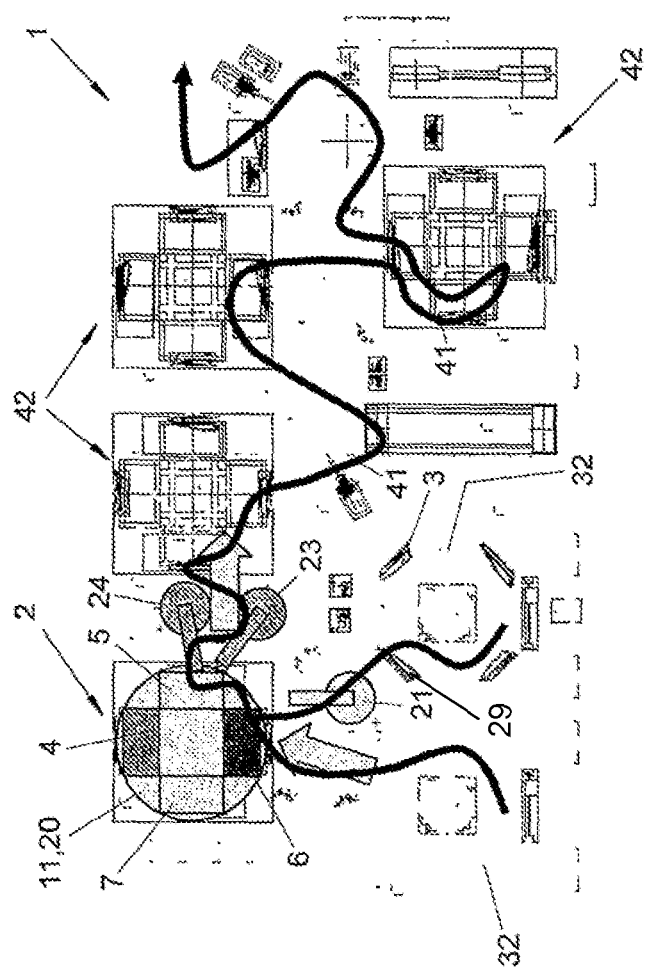
FIG. 8 is a schematic view of a manufacturing plant with a manufacturing apparatus according to FIG. 7 and with a linkage to further manufacturing apparatuses.

The manufacturing apparatus (2) may be an integral part of a more comprehensive manufacturing plant (1) and in this plant (1) may be tied or linked to other plant parts (42). FIG. 8 shows by way of example such a linkage (41). The manufacturing apparatus (2) may also be present multiply and in different embodiments within the manufacturing plant (I), in which case there may be an indirect or direct linkage (41) between the manufacturing apparatuses (2).

The components (3) or, in general, workpieces may be of any desired type. They are preferably body components of bodies in white. These may be, for example, side walls, roof parts, bottom groups or the like. The components (3) consist, for example, of a plurality of initially loose component parts which are assembled and joined to one another in the manufacturing apparatus (2). The joining processes may be of any desired type, for example welding, adhesive bonding, riveting or the like. The component machinings carried out in the manufacturing apparatus (2) may involve, alternatively or additionally to the joining processes, other machining processes, for example forming processes, heat treatment or the like.

The invention relates to a manufacturing method and to the manufacturing apparatus (2) illustrated in different variants in the drawings. Furthermore, the invention also relates to a manufacturing plant (1) which is equipped with one or more such manufacturing apparatuses (2) and which is illustrated in the form of a detail, for example, in FIGS. 1 and 8.

The manufacturing apparatus (2) comprises at least one loading station (20) with at least one tool (4, 5, 6 , 7 , 8) for receiving the components (3) and with at least one machining station (22, 22') which is connected to the loading station (20) and which is equipped with one or more machining devices (23) for machining the components (3).

Figure 5:
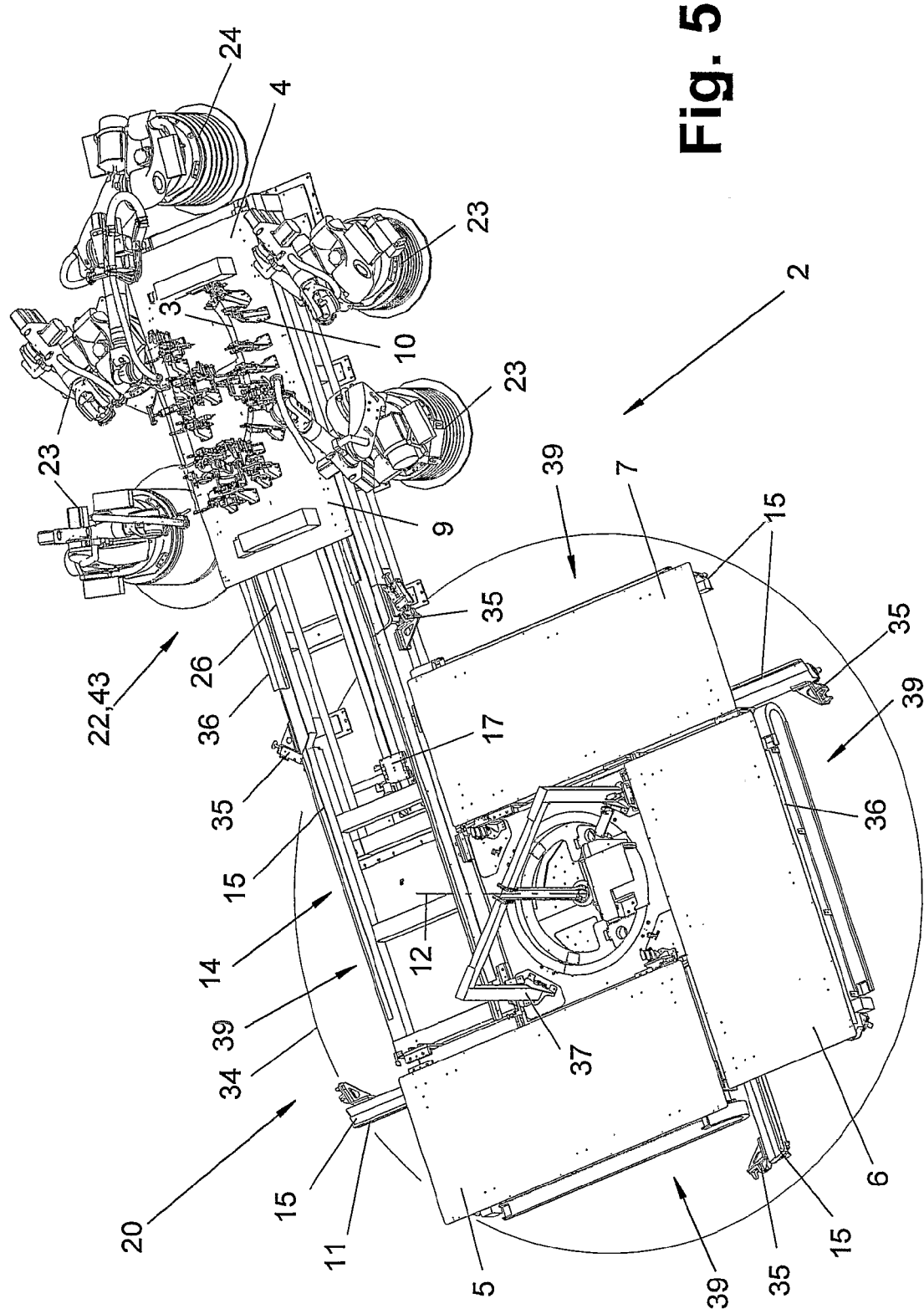
FIG. 5 is a schematic perspective view of a manufacturing apparatus.
Figure 6:
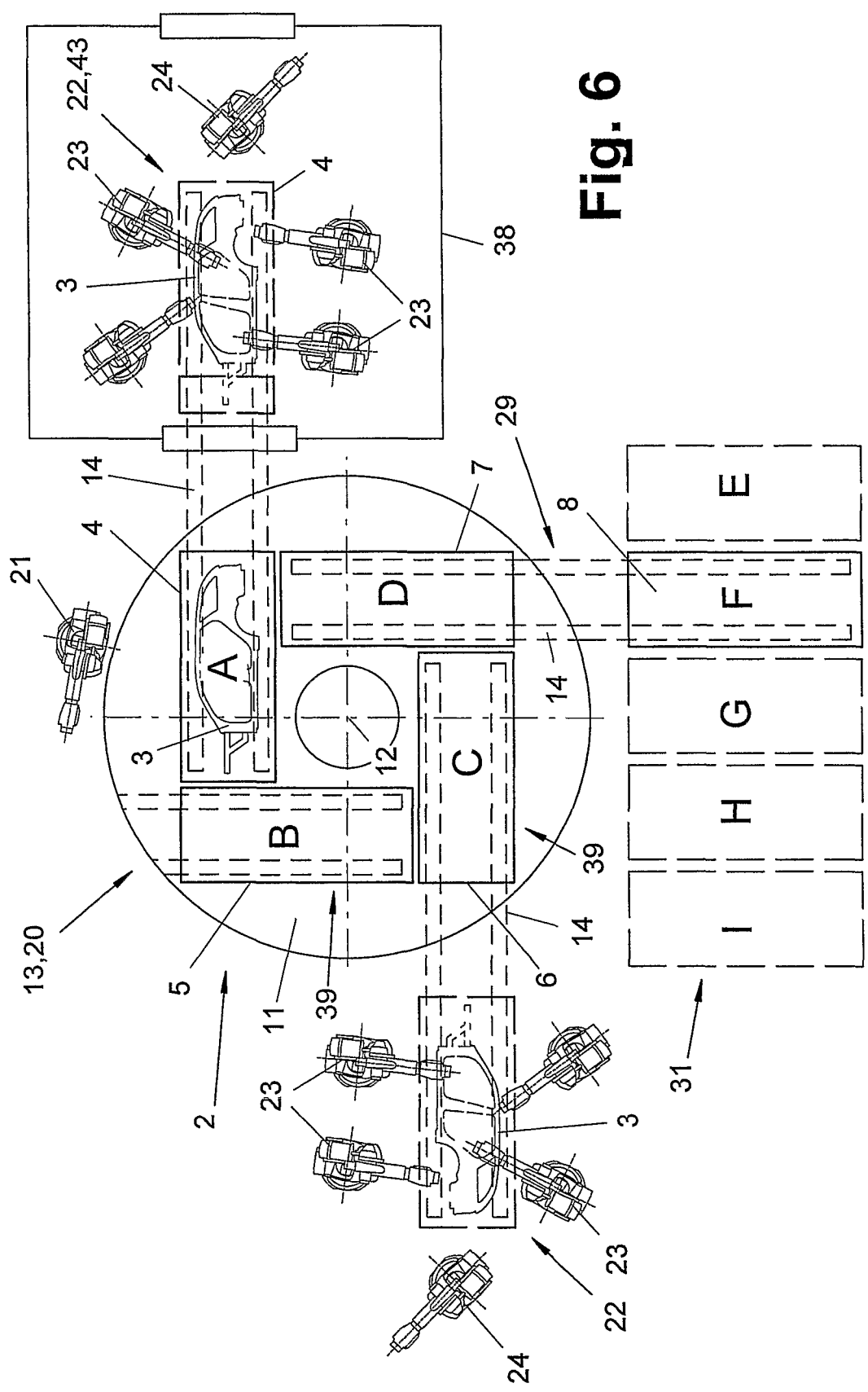
FIG. 6 is a schematic view showing a variant of the manufacturing apparatus with an additional machining station.
Figure 7:
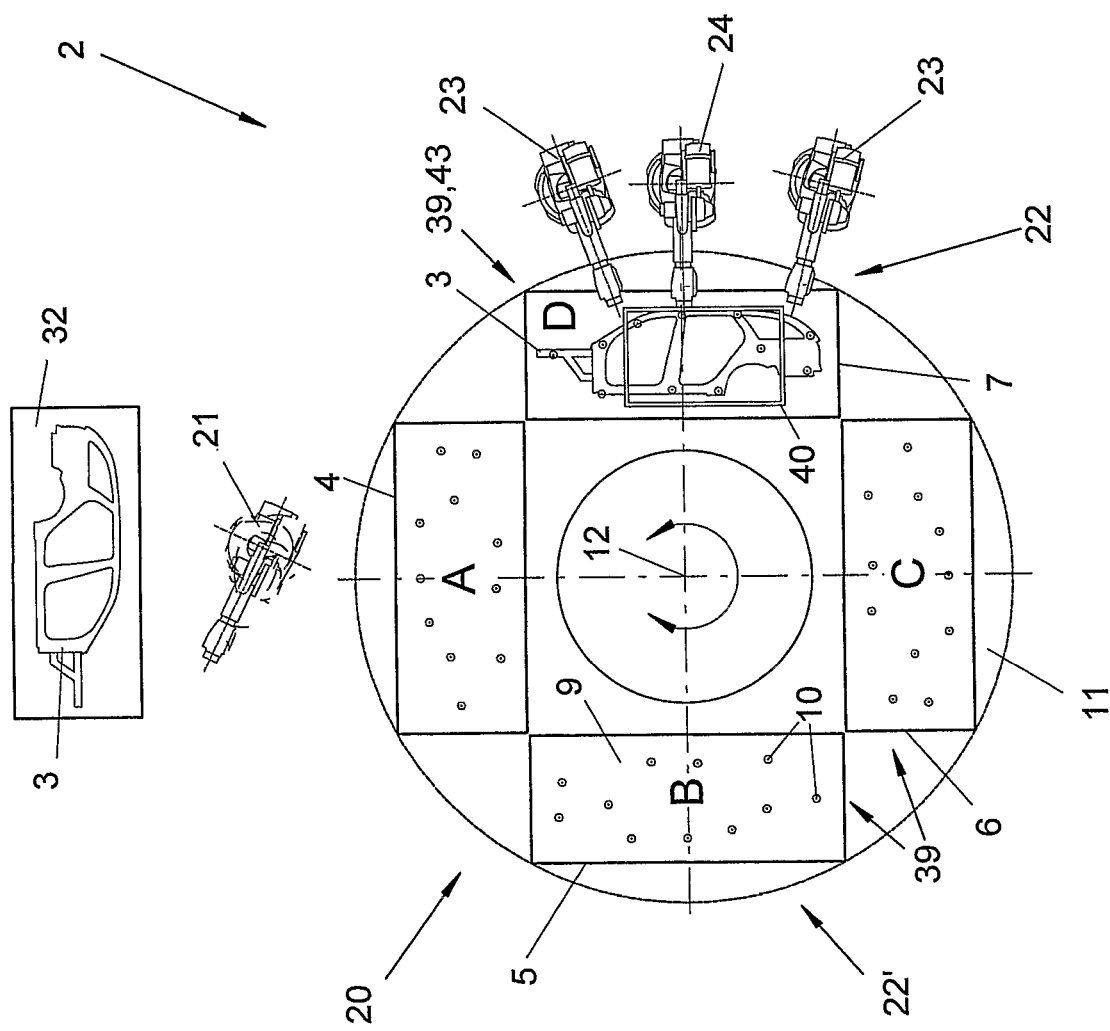
FIG. 7 is a schematic view showing a variant of the manufacturing apparatus with a machining station arranged on the turntable.

The machining station or stations (22 , 22') may be arranged on or at the loading station (20). The machining point (43) for the component (3) is in this case located, for example, on the loading station (20). FIGS. 7 and 8 show such a variant. The machining station or stations (22, 22') and the machining point or points (43) may also be arranged separately and adjacently next to the loading station (20), as illustrated in FIGS. 1 to 6. In the variants of FIGS. 1 to 5 and 7, an individual machining station (22) is present. In the variant of FIG. 6, two machining stations (22, 22') are shown, which are arranged on opposite sides of the loading station (20) or at another suitable point. Such a configuration is also possible in the variant of FIG. 7.

The loading station (20) may be designed differently. It is, for example, at the same time designed as a tool magazine (13). The loading station (20) has, for example, a floor-bound and preferably stationary turntable (11) with a, for example, vertical, if appropriate stationary, turntable axis (12). A plurality of tools (4, 5, 6, 7) are movably mounted at a plurality of reception points (39) on the turntable (11). The tools (4, 5, 6, 7) can be moved to and fro between the turntable (11) and the separate machining station (22, 22') by means of a controllable tool conveyor (16) according to FIGS. 1 to 6.

In a variant, not illustrated, the loading station (20) may be designed as a circular or annular revolving conveyor, on which the tools (4, 5, 6, 7) are conveyed in an endless path, the conveying movement taking place continuously in one direction or in reverse. The turntable, too, may have such kinematics.

Figure 1:
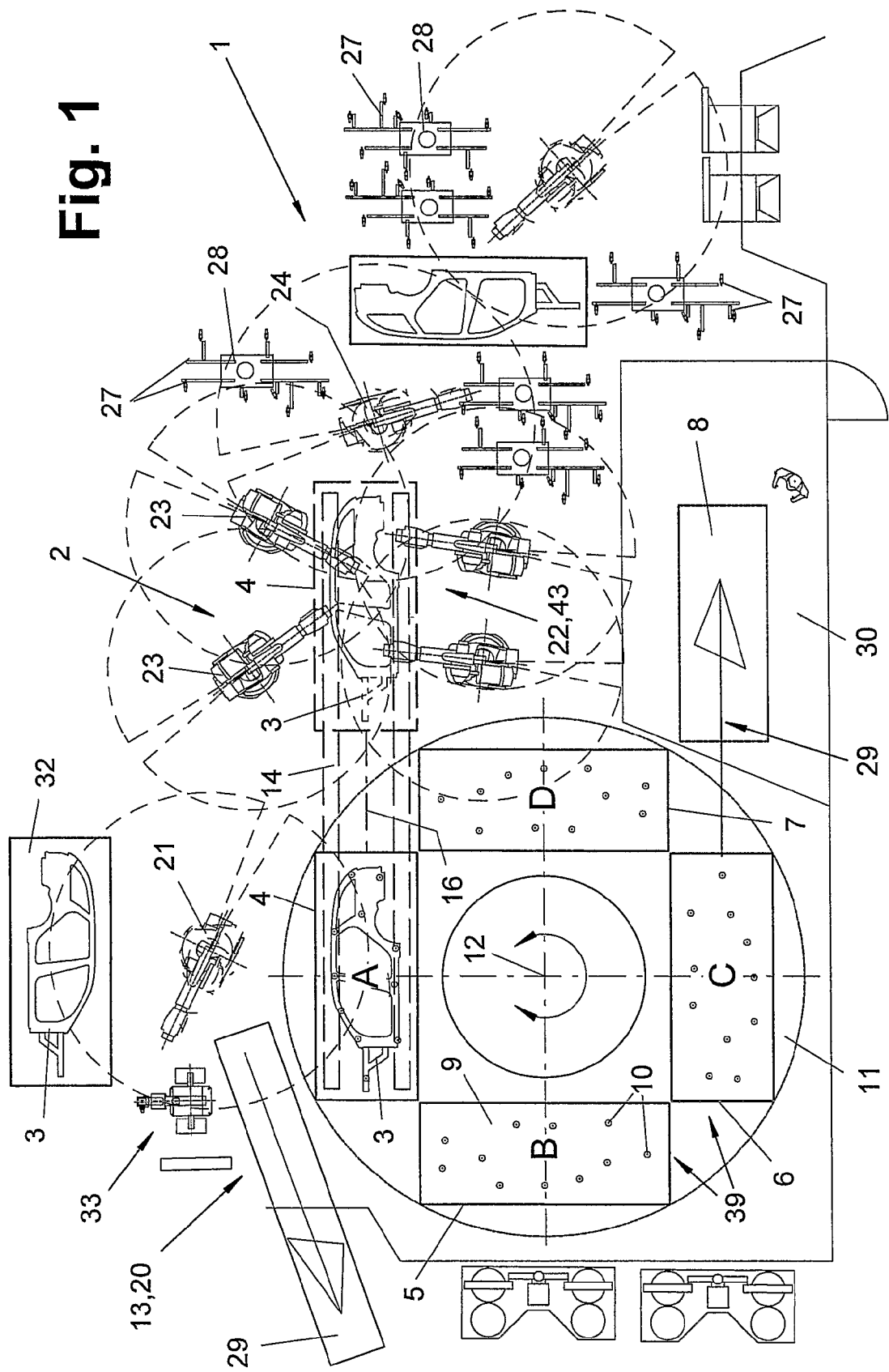
FIG. 1 is a schematic view of a manufacturing plant with a manufacturing apparatus having a combined loading station and tool magazines and a machining station.

The tools (4, 5, 6, 7) are designed differently and are provided for different component sorts or component types A-I and adapted to these. On the loading station (20), in particular the turntable (11), the different tools (4, 5, 6, 7) are arranged so as to be distributed uniformly in a circle about the turntable axis (12). They assume, for example, a horizontal position and are located in the same plane on the turntable (11). Each reception point (39) in this case receives a tool (4, 5, 6, 7). In the exemplary embodiment of FIGS. 1, 2 and 7, the turntable (11) accommodates four tools (4, 5, 6, 7) at four reception points (39). In the variant of FIG. 3, there are three tools (4, 5, 6) and reception points (39). In the embodiment of FIGS. 1 and 7, the four tools (4, 5, 6, 7) are arranged diagonally. FIGS. 2 and 5 show a variant with a nested and partially overlapped tool arrangement. Here, the tools (4, 5, 6, 7) are in each case contiguous with one end face to a wide side of the adjacent tool (4, 5, 6, 7).

As FIGS. 1, 4 and 5 illustrate, the tools (4, 5, 6, 7, 8) in each case consist of a tool carrier (9) and of a clamping device (10), arranged on the latter, for receiving the components (3) and their parts. The tool carriers are preferably designed identically to one another and, for example, as plates or pallets. The clamping devices (10) are adapted to the different component types A-I and are correspondingly designed differently. The clamping devices (10) may have a multiplicity of tensioners which are driven and can be remotely controlled individually. According to FIGS. 4 and 5, the tensioners may be arranged on columns and lift off the component (3) from the tool carrier (9) and space it apart. Furthermore, the clamping device (10) may possess stops, indexes or other positioning devices. It may also have other tool parts, not illustrated. During the loading operation, the components (3) are introduced onto the clamping device (10), positioned and tensioned manually by a worker or automatically by means of one or more loading devices (21).

If a component (3) consists of a plurality of loose component parts, these parts are introduced into the tool (4, 5, 6, 7) and tensioned in their intended relative position individually or as a set.

During the loading operation, an intermediate step may be inserted, in which, for example, the components (3) or individual parts of these are treated before the loading of the tools (4, 5, 6, 7, 8), in that they are provided, for example, with an adhesive bead, a coating or the like. FIG. 1 shows diagrammatically, in this respect, such a treatment device (33) in the working region of the loading device (21). The loading device (21) may be designed in any suitable way desired. It is preferably a multiaxial industrial robot, in particular an articulated-arm robot with six or more axes. The robot (21) may be arranged in a stationary manner. It may alternatively have one or more additional movement axes, in particular travel axes.

In the variants of FIGS. 1 to 6 having the separate, preferably stationary machining station (22, 22'), the tools (4, 5, 6, 7, 8) are mounted movably on the turntable (11) in the way initially mentioned. The movable mounting may be implemented in any suitable way desired. In the embodiment shown, a guide (14) is provided at each reception point (39) for the associated tool (4, 5, 6, 7, 8). This guide is, for example, a rail guide, on which the tool carrier (9) is mounted and guided in a longitudinally movable manner. This may be a sliding guide, a rolling guide, or the like. For this purpose, the tool carrier (9) may have corresponding running mechanisms on the underside, such as are illustrated diagrammatically in FIG. 4. The guide (14) is of preferably straight design. Moreover, it is split and divided into a plurality of guide portions (15) at the reception points (39) on the top side of the turntable (11) and into a guide portion (26) at the machining point (43) of the machining station (22, 22'), said guide portion being mounted and supported preferably fixedly on a station stand (25). The guide or rail portions (15, 26), for example, all lie at the same height or in the same plane perpendicularly to the turntable axis (12).

The reception points (39) and the guide or rail portions (15) on the turntable (11) are, for example, arranged in the same plane and so as to be distributed uniformly in a circle and are oriented, for example, tangentially with respect to the axis of rotation (12) or to the circle contour. They in this case form secants of the, for example, circular turntable (11). The turntable (11) has a, for example, essentially planar table surface or table plane oriented transversely with respect to the axis of rotation (12). Said turntable may have, for example, an essentially circular, one-part or multipart and preferably planar table plate with rail portions (15) arranged on it, as is indicated in FIGS. 1 and 2. Alternatively, the turntable (11) may have a frame-like or scaffold-like table stand (37) which forms the carrying structure for the guide or rail portions (15) and, together with these, the table plane. This version, with its fringe contour (34) occurring during the table rotation, is illustrated in FIG. 5.

The individual rails for the rail portions (15) are, if appropriate, offset longitudinally with respect to one another and of different length. They terminate jointly at the table edge or at the fringe contour (34) and there have ends beveled or rounded according to the contour rounding. The stationary guide or rail portions (26) may likewise have correspondingly adapted ends.

A tool (4, 5, 6, 7) is arranged in a longitudinally travelable manner on each guide portion or rail portion (15). As a result of a rotation of the turntable (11), the guide or rail portions (15, 26) are brought into congruence, so that the tool conveyor (16) can displace the tool (4, 5, 6, 7) from the turntable (11) to the machining station (22, 22') and back again.

At the connection points of the guide or rail portions (15, 26), controllable and extendable pegs (35) can be arranged, which bring the ends, possibly deformed elastically and lowered under the load, of the guide or rail portions (15, 26) into common alignment for a continuous fault-free guide (14).

As FIG. 4 illustrates, the tool conveyor (16) is, for example, floor-bound and is arranged below the turntable (11) and the guide (14). The tool conveyor (16) may be designed in any suitable way desired. It may selectively be assigned to the machining station (22, 22') or be arranged on the turntable (11) and be present multiply in a corresponding way. In the exemplary embodiment shown, it consists of a revolving drag conveyor (17) which is designed, for example, as a toothed-belt drive. The drag conveyor (17) possesses, for example, at least one movable driver (18) which comes into engagement with corresponding receivers (19) on the underside of the tools (4, 5, 6, 7, 8) or of the tool carriers (9).

For this purpose, the driver (18) has, for example, a driven drag pin which is extendable by remote control and which can engage positively from below into a bore on the receiver (19). On the turntable (11) and on the station stand (25), corresponding recesses may be present, which allow a passage of the driver (18) and of the receiver (19).

In another embodiment, not illustrated, of the drag conveyor (17), there may be arranged, for example on the underside of the tool carrier (9), a controllable clamping device which clamps on and off on the conveying means, for example said toothed belt or the like, driven in a revolving or reversing manner. In this variant, the drag conveyor (17) is arranged in a stationary manner in the region of the machining station (22, 22'). In a further variant, not illustrated, the tool conveyor (16) may be designed as a telescopic chain drive, as a spindle drive or the like.

Moreover, a suitable energy supply (36) for the tool carrier (9) and for its clamping device (10) or for other carrier parts may be present, which, for example according to FIG. 5, is designed as a trailing cable assembly assigned to the turntable (11) and comoved with the tool carrier (9). In a variation of this, the energy supply (36) may be designed as a controllable multicoupling for the equipment lines, with extendable and pluggable coupling parts on the turntable (11) and on the machining station (22, 22').

Moreover, the turntable (11) may be connected to one or more service stations (30) for the tools (4, 5, 6, 7, 8). For the transport of the tools (4, 5, 6, 7, 8) between the turntable (11) and the service station (30), there is an exit (29) which may be designed for tool transport in the same way as or a similar way to the machining station (22, 22') and which may have a tool conveyor (16) of the type described above. Alternatively, manual conveying operation, if appropriate with a rope assembly or the like, is possible. One or more guide or rail portions together with pegs (not illustrated) may be located in the service station (30). FIG. 1 shows such a configuration.

According to FIG. 2, one or more additional tool magazines (31) may also be connected to the turntables (11) via a corresponding exit (29). A plurality of further tools (8) may be stored in this additional magazine (31). If more than three or four different component types A-D are run in the manufacturing plant (1) or manufacturing apparatus (2), the tools (4, 5, 6, 7) arranged on the turntable (11) can be correspondingly changed and exchanged, as required. The additional magazines (31) may likewise be designed as rotary magazines or, for example as in the version shown, as displacement magazines. In principle, the number, size, kinematics and configuration of the additional magazines (31) may be selected as desired.

In the embodiments shown, a plurality of machining devices (23) with suitable and, if appropriate, changeable machining tools are arranged at the machining station (22, 22'). In the embodiments shown, the machining station (22, 22') is designed, for example, as a geometric welding station. The machining devices (23) are in this case designed as multiaxial welding robots, in particular articulated-arm robots with six or more axes. The loose component parts are joined to one another in the geometric welding station. Alternatively, adhesive bonding processes or, if appropriate, even other machining processes may take place in the way described above.

As FIG. 6 illustrates, a machining station (22, 22') may also be surrounded by a protective booth (38) which is designed, for example, as a laser booth for a laser welding process. The protective booth (38) may have controllable safety locks for the supply and discharge of the tool carriers (9) and, if appropriate, of the machined workpieces (3).

At the machining station (22, 22'), at least one handling device (24) is provided, which is intended for handling the components (3) and also for releasing the components (3) from the tool (4, 5, 6, 7, 8). The handling device (24) is likewise designed as a multiaxial industrial robot, preferably an articulated-arm robot with six or more axes. It carries a robot tool (27), for example a gripping tool (40), by means of which the component (3) can be gripped, raised and released from the tool (4, 5, 6, 7, 8) after the first joining operation and the connection of the component parts. The robot (24) can hold the component (3) in suspension while the robots (23) continue their machining operations.

During this time, the released tool (4, 5, 6, 7, 8) can be conveyed from the machining station (22, 22') back onto the turntable (11) where it is ready for new loading or a tool change per table rotation. The machining and set-up times for the remaining machining operations in the machining station (22, 22') and the new loading and/or the tool change can thereby be overlapped in time. After the termination of the machining operations, the robot (24) can transport the workpiece (3) further on and transfer it to the next plant station for the continuation of the manufacturing process. FIG. 1 shows this in the form of a detail. The robots (23) can meanwhile already take up the machining of the next component (3) supplied. In adaptation to the different component types, the robot (24) may possess different and exchangeable robot tools (27) which are arranged in its tool region in one or more tool magazines (28).

In the variant of FIG. 7, one or more machining stations (22, 22') are incorporated into the loading station (20) or are arranged directly at the loading station (20). In this case, the reception point (39) serves at the same time as a machining point (43), the workpiece (3) being machined on the loading station (20), in particular the turntable (11). In this embodiment, too, different tools (4, 5, 6, 7) for different workpieces (3) may be arranged at the reception points (39), as illustrated in FIG. 7. Alternatively, two or more reception points may have identical tools (4, 5, 6, 7). This may be the case particularly when a plurality of machining stations (22, 22') are arranged at or on the loading station (20). The tools (4, 5, 6, 7) are arranged, for example, in a stationary manner on the loading station (20), in particular the turntable (11). They can be exchanged, as required, in the way described above.

One or more loading devices (21) and also exits (29) and service stations (30) may also be arranged at the loading station (20).

In the variant of FIG. 7, the workpiece (3) is machined at the reception point (39) and on the loading station (20) by one or more machining devices (23). These may be arranged, floor-bound, laterally next to the loading station (20) or at another point, for example above the loading station (20). Moreover, at least one handling device (24) is present, which, in the way described above, can handle the workpiece (3) and, after the first machining and, in particular, joining operations have been carried out, release it from the tool (4, 5, 6, 7). For this purpose, the handling device (24) may have, for example, the gripping device (40) indicated in FIG. 7.

In this embodiment, too, an overlap of the machining and loading times is possible. As soon as the first machining operations are carried out and, for example, the workpiece (3) is sufficiently stabilized mechanically, it can be released and, in particular, raised from the tool (4, 5, 6, 7) by the handling robot (24), further machining by the machining devices (23) taking place in this release position. During this process time, the loading station (20), in particular the turntable (11), can move the empty tool (4, 5, 6, 7) back into the loading position on the loading device (21) for reequipping. Subsequently, the loaded tool (4, 5, 6, 7) can be brought to the machining station (22, 22') again, which may likewise take place during the remaining machining time. When the machining of the first workpiece (3) is terminated, the machining devices (23) can immediately machine the new workpiece (3) on the tool (4, 5, 6, 7), the handling device (24) having sufficient time for delivering the workpiece (3) previously machined. The machining process then commences again anew.

If a plurality of machining stations (22, 22') are arranged on or at the loading station (2), a mutual coordination of the machining times and of the set-up times with the reequipping of the tools (4, 5, 6, 7) is recommended. In the case of a multiple arrangement of machining stations (22, 22'), these may machine identical or different workpieces (3), identical or different tools (4, 5, 6, 7) being correspondingly present.

In the embodiment of FIG. 7, a diagonal arrangement of the tools (4, 5, 6, 7) is advantageous. In this arrangement, as a rule, there is more space for the machining and handling devices (23, 24) than in the overlapped arrangement according to FIG. 2, such an arrangement likewise being basically possible.

As FIGS. 1 and 8 illustrate, furthermore, a supply device (32) for components (3) or their component parts may be arranged in the region of the loading device (21). Here, the components (3) are provided for loading the tools (4, 5, 6, 7, 8). This may be, for example, as in FIG. 8, at least one conventional turntable. Furthermore, another type of exit (29) for components (3) or component parts or for tools (4, 5, 6, 7, 8) may be present at the loading device (21). In this case, the loading device (21) can grasp the components by means of corresponding gripping devices and place them onto the exit (29), designed as a conveyor, in order to be transported away. A tool change is carried out correspondingly.

Modifications of the embodiments shown and described are possible in various ways. In particular, the features of the various exemplary embodiments shown may be combined and/or exchanged with one another in any desired way.

More than two machining stations (22, 22') may be connected to a turntable (11), if appropriate at different points, via corresponding tool conveyors (16). Conversely, a separate machining station (22) may be connected to a plurality of turntables (11). The number of tools and guide portions (15) arranged on a turntable (11) may vary between two and as many as desired. Their orientation, which, for example, may be radial, is also variable.

Moreover, the turntable (11) does not have to be arranged in the orientation shown, with an essentially vertical axis of rotation (12) and a horizontal table plane and tool plane. The turntable (11) may alternatively have an oblique or horizontal axis of rotation (12) with an oblique or vertical table plane and tool plane and with a correspondingly designed guide (14). Furthermore, the axis of rotation (12) may be arranged movably, for example in a tiltable or traveling manner. The machining station (22, 22'), the tool magazine (28) and the service station (30) may also be adapted correspondingly.

In a further variation, it is possible to design the reception points (39) differently, for example as a stationary or stationary holding device or holding devices or a holding device or holding devices provided with one or more additional axes, for a plurality of tools (4, 5, 6, 7, 8) or tool carriers (9). These may be, for example, stationary or rotatable drum-type or carrying stands which, for example, have a prismatic cross-sectional shape. Furthermore, the configuration and arrangement of the tool conveyor (16) are variable. The arrangement and configuration of the machining station (22, 22') is also variable in any desired way. The embodiments shown and described in the exemplary embodiments may be interchanged and combined in any desired way in terms of their features. In particular, one or more service stations (30) and one or more additional tool magazines (31) may be connected to the turntables (11).

While specific embodiments of the invention have been shown and described in detail to illustrate the application of the principles of the invention, it will be understood that the invention may be embodied otherwise without departing from such principles.

What is claimed is:

1. A manufacturing apparatus for components, the apparatus comprising:
   a rotatable loading, station comprising a tool magazine, said loading station comprising a plurality of reception points with a plurality of different tools for different types of components, said rotatable loading station comprising at least one machining station or machining point to and from which said rotatable loading station is configured to rotate said tools;
   a loading means for at least providing one or more of said components to said rotatable loading station, said loading means being arranged adjacent to a periphery of said rotatable loading station, wherein said loading means is located at a position outside of said rotatable loading, station;
   a handling means for at least removing said one or more of said components from said rotatable loading station, each of said loading means and said handling means being rotatable about at least two rotational axes, said handling means being separate from said loading means and said handling means being operated independently of said loading means, said handling means being arranged adjacent to said periphery of said rotatable loading station, wherein said handling means is located at another position outside of said rotatable loading station, said handling means being located at a spaced location from said loading means; and
   a machining means associated with said at least one machining station or machining point for machining one or more said components while said one or more components are on said rotatable loading station and are located at the at least one machining station or machining point, said handling means being arranged adjacent to said machining means and being configured to at least remove said one or more components from the at least one machining station or machining point.

2. A manufacturing apparatus in accordance with claim 1, wherein said at least one machining station or machining point comprises a plurality of machining stations or machining points, said plurality of machining stations or machining points being on opposite sides of the loading station.

3. A manufacturing apparatus in accordance with claim 1, wherein each of said plurality of reception points has one of said tools, each of said tools being of a same kind.

4. A manufacturing apparatus in accordance with claim 1, wherein said machining means is arranged at said at least one machining station or machining point.

5. A manufacturing apparatus in accordance with claim 1, wherein said machining means is arranged adjacent to said rotatable loading station, said machining means being fixed to a floor.

6. A manufacturing apparatus in accordance with claim 1, wherein a portion of said machining means is arranged above said rotatable loading station.

7. A manufacturing apparatus in accordance with claim 1, further comprising:
   a feeding device for said components, said feeding device being arranged at said rotatable loading station.

8. A manufacturing apparatus in accordance with claim 1, further comprising:
   an exit device for said tools, said exit device being arranged at said rotatable loading station.

9. A manufacturing apparatus in accordance with claim 1, wherein one or more of said loading means and said handling means comprises at least one multi-axle industrial robot with one or more robot tools for handling one or more of the components, or wherein said machining means comprises a multi-axle industrial robot with a robot tool for machining.

10. A manufacturing apparatus in accordance with claim 9, wherein said robot tool for machining comprises one or more of joining tools and tools for reshaping or for heat treatment.

11. A manufacturing apparatus in accordance with claim 9, wherein said one or more robot tools for handling comprise a gripping means for one or more of at least one of said components and one or more of said tools.

12. A manufacturing apparatus in accordance with claim 1, wherein said rotatable loading station comprises a turntable, said loading means and said handling means being associated with different locations of said rotatable loading station at the same time, said handling means holding at least one of said one or more said components while said machining means machines said at least one of said one or more said components.

13. A manufacturing apparatus in accordance with claim 1, wherein said rotatable loading station comprises said plurality of reception points with said tools mounted in a fixed or movable manner.

14. A manufacturing apparatus in accordance with claim 1, wherein said rotatable loading station is connected to one or more service stations for the tools.

15. A manufacturing apparatus in accordance with claim 1, wherein said rotatable loading station is connected to at least one said tool magazine.

16. A manufacturing apparatus in accordance with claim 1, wherein said rotatable loading station has two, three or four of the different tools.

17. A manufacturing apparatus in accordance with claim 1, wherein said tools comprise a tool carrier with a clamping means for one or more of the components.

18. A manufacturing apparatus in accordance with claim 1, wherein said tools have uniform tool carriers and different clamping means.

19. A manufacturing apparatus in according, with claim 1, wherein said at least one machining station or machining point is a welding station, said components comprising first loose components, said first loose components being connected to one another at said welding station.

20. A manufacturing plant for components, comprising:
a manufacturing apparatus according to claim 1.

21. A manufacturing plant in accordance with claim 20, wherein said rotatable loading station is rotatable about a rotatable axis thereof, each of said tools being substantially perpendicular to said rotatable axis.

22. A manufacturing plant in accordance with claim 21, wherein each of said tools is provided on a planar, horizontally extending surface of said rotatable loading station, said planar, horizontally extending surface being substantially perpendicular to said rotatable axis.

23. A manufacturing plant in accordance with claim 20, wherein said manufacturing apparatus further comprises another machining means associated with said at least one machining station or machining point for machining said one or more of said components while said one or more components are on said rotatable loading station, said handling means being located between said machining means and said another machining means.

24. A manufacturing apparatus in accordance with claim 23, wherein each of said tools is provided on a planar, horizontally extending surface of said rotatable loading station, said planar, horizontally extending surface being substantially perpendicular to said rotatable axis.

25. A manufacturing apparatus in accordance with claim 1, wherein said rotatable loading station is rotatable about a rotatable axis thereof, each of said tools being substantially perpendicular to said rotatable axis.

26. A manufacturing apparatus in accordance with claim 1, further comprising:
another machining means associated with said at least one machining station or machining point for machining said one or more of said components while said one or more components are on said rotatable loading station, said handling means being located between said machining means and said another machining means.

27. A manufacturing apparatus in accordance with claim 1, wherein said loading means and said handling means are associated with different locations of said rotatable loading station at the same time, said handling means releasing and raising at least one of said one or more components from one of said plurality of different tools to define a released and raised state of said at least one of said one or more components such that said at least one of said one or more components is located at a spaced location from said one of said plurality of different tools, said handling means holding said at least one of said one or more said components in said released and raised state while said machining means machines said at least one of said one or more said components.

28. A manufacturing apparatus in accordance with claim 27, wherein said rotatable loading station is rotated to bring an empty tool to a loading site located within an operating range of said loading means while said machining means machines said at least one of said one or more said components and said handling means holds said at least one of said one or more components in said released and raised state.

29. A manufacturing apparatus for components, the apparatus comprising:
a rotatable loading station comprising a first tool and a second tool, said first tool and said second tool each receiving at least one component, said rotatable loading station comprising at least one machining station or machining point to and from which said rotatable loading station is configured to rotate said first tool and said second tool;
a loading robot located adjacent to said rotatable loading station at a spaced location from said rotatable loading station, wherein one or more of said first tool and said second tool receive said at least one component via said loading robot, said loading robot being associated with a first portion of said rotatable loading station to define a loading area of said rotatable loading station;
a handling robot arranged adjacent to said rotatable loading station, wherein said at least one component is removed from one or more of said first tool and said second tool via said handling robot; and
a machining robot, said handling robot and said machining robot being associated with a second portion of said rotatable loading station to define a machining and handling section of said rotatable loading station, wherein said handling robot and said loading robot are associated with different areas of said rotatable loading, station at a same given instance, said handling robot being operated independently of said loading robot, said machining robot machining one or more of said components while said one or more components are on said rotatable loading station and are located at the at least one machining station or machining point, said handling robot being arranged adjacent to said machining robot and being configured to remove said one or more components from the at least one machining station or machining point, said second portion of said rotatable loading station being located at a spaced location from said first portion of said rotatable loading station.

30. A manufacturing apparatus in accordance with claim 29, wherein said machining robot is arranged adjacent to said rotatable loading station, said machining robot being fixed to a floor at a position adjacent to said rotatable loading station, a portion of said machining robot being located above said rotatable loading station, wherein one or more of said loading robot, each of said loading robot, said machining robot and said handling robot comprising a movable arm that is rotatable about at least two rotational axes.

31. A manufacturing apparatus in accordance with claim 30, wherein said machining robot is provided with one or more robot tools comprising joining tools and/or tools for reshaping or for heat treatment.

32. A manufacturing apparatus in accordance with claim 31, wherein said handling robot is provided with one or more robot tools comprising a gripping means for one or more of at least one of said components and one or more of said tools.

33. A manufacturing apparatus in accordance with claim 29, further comprising:
another machining robot for machining said one or more of said components while said one or more components are on said rotatable loading station, said handling robot being located between said machining robot and said another machining robot, wherein said rotatable loading station is rotatable about a rotatable axis thereof, each of said tools being substantially perpendicular to said rotatable axis, each of said tools being provided on a planar, horizontally extending surface of said rotatable loading station, said planar, horizontally extending surface being substantially perpendicular to said rotatable axis.

* * * * *